United States Patent [19]
Lundahl et al.

[11] Patent Number: 5,309,702
[45] Date of Patent: May 10, 1994

[54] CUTTING TOOTH

[75] Inventors: E. Cordell Lundahl, Providence; Laurel H. Jensen, Hyrum, both of Utah

[73] Assignee: Lundahl Research, Inc., Logan, Utah

[21] Appl. No.: 932,602

[22] Filed: Aug. 20, 1992

[51] Int. Cl.⁵ ............................................. A01D 34/44
[52] U.S. Cl. ...................................... 56/156; 56/249; 56/DIG. 17; 460/121
[58] Field of Search ................. 56/154, 156, 249, 294, 56/53, DIG. 9, DIG. 17, DIG. 20; 460/121, 122

[56] References Cited

U.S. PATENT DOCUMENTS

| | | | |
|---|---|---|---|
| 3,073,100 | 1/1963 | Kingsley | 56/294 |
| 3,657,869 | 4/1972 | Ayranto | 56/294 |
| 3,862,539 | 1/1975 | Stevens | 56/294 X |
| 4,550,554 | 11/1985 | Lundahl et al. | 56/294 |
| 5,005,342 | 4/1991 | Lundahl et al. | 56/156 X |

*Primary Examiner*—Terry L. Melius
*Attorney, Agent, or Firm*—Rockey, Rifkin & Ryther

[57] ABSTRACT

Impact cutter teeth that cut and lift the crop to improve both cutting and transport of the crop are novel features of this invention. The novel construction of this tooth results in actions which reduce undesired recut characteristics present in impact cutters with prior art teeth.

6 Claims, 1 Drawing Sheet

CUTTING TOOTH

BACKGROUND OF THE INVENTION

The desirability of auger cutters to cut standing and downed crops has previously been recognized. Such cutters are efficient and generally less susceptible to jamming or plugging and damage than the well-known sickle bar and rotary blade types of cutters. Prior art crop processors include many devices showing auger type cutters of various configurations including some with attached cutting teeth for various purposes. The best prior art illustrating cutter teeth for use with such crop processors is shown and described in U.S. Pat No. 5,005,342 and the references cited therein.

SUMMARY OF THE INVENTION

A principle object of the invention is to provide improved cutting and handling utilizing lifting action on the cut crop using auger cutter mechanisms. Another object is to provide such improved handling while simultaneously reducing any recutting of the crop which was a disadvantage with previous auger cutters. Another object is to provide improved handling characteristics and to cut crop losses by reducing leaf loss.

FEATURES OF THE INVENTION

Principle features of the invention include utilization of the tooth with a cutter assembly having an auger cutter with a central tubular shaft and auger flights extending there around. The auger flights are formed from a flange that is helical around the central shaft and the direction of rotation of the helix may reverse at a selected point on the tube. Cutting teeth are attached to the flighting near the peripheral outer edge to cut the standing and downed crop at the base of the stalks. The teeth of this novel design are attached in a variety of ways depending upon the crop to be cut and the amount of the crop. The teeth project in the same direction as the flange of the helix to which they are attached.

Additional objects and features of the invention will become apparent from the following detailed description, drawings and claims.

DETAILED DESCRIPTION OF A PREFERRED EMBODIMENT OF THE INVENTION

Figure 2:
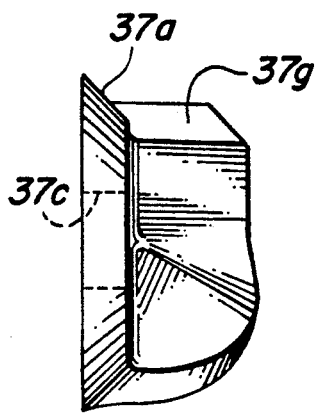
FIG. 2 is an objective view of the tooth from the top.
Figure 3:
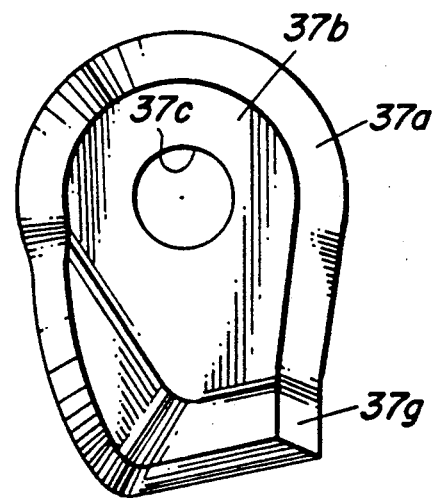
FIG. 3 is plan view of the tooth from the reverse side.

Referring now to the drawings, the teeth are best described with references to FIGS. 2, and 3. The teeth incorporate several features which give the teeth long operational life, impact resistance, versatility, etc. The individual tooth is generally of a horse shoe configuration similar to that shown in FIG. 15 of U.S. Pat. No. 5,005,342.

The tooth of this invention includes a beveled surface 37a and a hole 37c for mounting the tooth at a flat surface 37b which is the backside of the tooth as it is in cutting position. A portion of the surface 37b and the beveled surface at the converging end of the horse shoe, which is the cutting edge 37(a), has a layer of hardened material applied to improve the wear and self-sharpening characteristics of the tooth. The tooth is bent at approximately 45 degrees in the direction of the beveled surface. This configuration of the tooth is similar to that described in column 7 line 37—45 of U.S. Pat. No. 5,005,342.

The mounting system for this tooth provides for the tooth to be mounted either in a fixed position or a swinging position. This tooth is capable of being mounted in only one direction in as much as it has only one cutting edge 37(a) as contrasted with the mounting options of two cutting edges of some prior art teeth. The tooth of this invention includes additional material having at least one surface extending from the flat surface of the tooth in the same direction as the 45 degree bend. This additional material is on only one side of the converging end of the tooth in the direction of the beveled surface 37(a). This additional surface joins the side of the horse shoe shaped flat surface opposite the cutting edge 37(a) with the bent portion. This additional material is heat treated but is not normally hard surfaced. One important surface of the added material also angles up away from the bent portion, the cutting edge 37(a), and beyond the converging portion of the tooth to provide a novel lifting action due to the abrupt change in direction of travel or flow of air and material.

The weight of the added material and the eccentric positioning of the added material used to form the lifting surface or portion enhances the operation of the teeth by helping to maintain the tooth in its cutting position when in a swinging mode by utilizing the increased centrifugal force.

Figure 1:
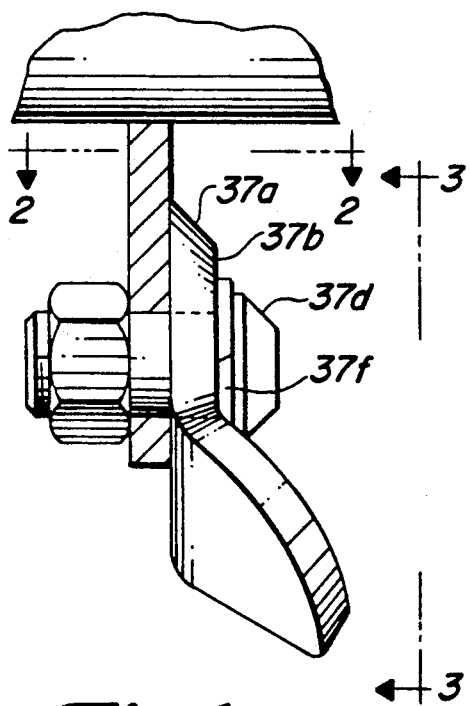
FIG. 1 shows the attachment of the teeth to the cutter auger.

This tooth can be mounted on the front of the flighting as shown in FIG. 1. As shown in FIG. 1 a lock washer 37f is used to maintain the tooth in a fixed position as the tooth rotates away from the observer. This permits any fixed cutting angle to be established as desired due to crop, etc. The lock washer can be removed from the bolt 37d to permit swinging of the teeth. The front side swinging mount as shown provides the most aggressive cutting action and is useful in most cutting situations. This is the operational condition where the increased eccentric centrifugal force aids the cutting action the most. The tooth is mounted so as to enable the forces created when hitting foreign objects to cause the tooth to retreat or rotate below the level of the auger flighting or flange. This rotational movement protects the tooth from destruction or damage when hitting foreign objects. Where the crop material is thicker and more rigid as in the case of corn, fixed mounting improves operation. The tooth will not automatically reset after hitting a foreign obstacle in the fixed mounting mode, but must be manually reset.

As noted the present disclosure is based on a preferred embodiment of the invention. Features and advantages other than those specifically pointed out herein will occur to those versed in the art, as will many modifications in the preferred embodiment presented all without departing from the spirit and scope of the invention.

We claim:

1. Teeth for attachment to the flighting of an auger on an auger cutter comprising; cutting teeth having a metal base plate of essentially horse shoe shape, including a circular portion and converging side portions, a hole towards the circular end of the base plate for attaching said teeth to auger flighting, said base plate having bevels on a major portion of a first flat surface, a portion of said bevels forming a cutting edge, said base plate being bent in the direction of said first flat surface, material added to the base plate on the converging side portion opposite the cutting edge connecting the bent portion and the side of the converging portion of said first flat surface opposite the cutting edge.

2. An improved tooth in accordance with claim 1 wherein said connecting material includes a surface facing said cutting edge having a curvature creating an abrupt change of direction of travel of the air and crop across the said tooth.

3. An improved tooth in accordance with claim 2 wherein said abrupt change of direction has an aerodynamically smooth curvature.

4. A tooth in accordance with claim 2 wherein said tooth includes hard surfacing on the converging side portion of the second flat surface and the bent portion forming the cutting edge.

5. A tooth in accordance with claim 1, wherein said added material is added eccentrically to the center of gravity of the tooth whereby the increased eccentric mass improves the eccentric centrifugal effect to hold the tooth in an operational position against cutting forces when said tooth is mounted to said flange in a none fixed mode.

6. An improved tooth in accordance with claim 5 wherein said eccentric centrifugal force for holding said tooth in cutting position is overcome by the force generated by the tooth hitting a foreign object causing said tooth to temporarily rotate rearwardly to a protected position below the level of said flighting.

* * * * *